US008385952B2

(12) United States Patent
Friedman et al.

(10) Patent No.: US 8,385,952 B2
(45) Date of Patent: Feb. 26, 2013

(54) MOBILE COMMUNICATIONS DEVICE USER INTERFACE

(75) Inventors: Jonathan D. Friedman, Seattle, WA (US); Michael J. Kruzeniski, Seattle, WA (US); Brian M. Wilson, Mercer Island, WA (US); Michael A. Smuga, Seattle, WA (US); Darren A. Apfel, Redmond, WA (US); Nell H. Hoffman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 12/484,799

(22) Filed: Jun. 15, 2009

(65) Prior Publication Data

US 2010/0159966 A1    Jun. 24, 2010

Related U.S. Application Data

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
    *H04W 4/00* (2009.01)
(52) U.S. Cl. ....... 455/466; 455/41.3; 455/565; 715/863; 715/702; 715/723; 715/849; 715/784
(58) Field of Classification Search .................. 455/566, 455/556.2, 414.1, 466, 418, 405, 406; 715/863, 715/702, 723, 764, 846, 733, 469, 26.5, 854, 715/837, 810, 784
    See application file for complete search history.

(56) References Cited

U.S. PATENT DOCUMENTS

| 5,189,732 A | 2/1993 | Kondo |
| 5,258,748 A | 11/1993 | Jones |
| 5,463,725 A | 10/1995 | Henckel et al. |
| 5,515,495 A | 5/1996 | Ikemoto |
| 5,574,836 A | 11/1996 | Broemmelsiek |
| 5,675,329 A | 10/1997 | Barker |
| 5,860,073 A | 1/1999 | Ferrel et al. |
| 5,905,492 A | 5/1999 | Straub et al. |
| 5,914,720 A | 6/1999 | Maples et al. |
| 5,963,204 A * | 10/1999 | Ikeda et al. ................... 715/723 |
| 6,008,816 A | 12/1999 | Eisler |
| 6,385,630 B1 | 5/2002 | Ejerhed |
| 6,396,963 B2 | 5/2002 | Shaffer |
| 6,424,338 B1 | 7/2002 | Andersone |
| 6,507,643 B1 | 1/2003 | Groner |
| 6,662,023 B1 | 12/2003 | Helle |

(Continued)

FOREIGN PATENT DOCUMENTS

| CN | 1936797 | 3/2007 |
| CN | 102197702 | 9/2011 |

(Continued)

OTHER PUBLICATIONS

"PCT Search Report and Written Opinion", Application No. PCT/US2009/061382, (May 26, 2010), 10 pages.

(Continued)

*Primary Examiner* — Joseph Arevalo
(74) *Attorney, Agent, or Firm* — Wolfe-SBMC

(57) ABSTRACT

A mobile communications device user interface is described. In an implementation, a method is implemented by a mobile communications device that includes outputting a user interface having a portion that is configured to accept content. When an option is selected in relation to the portion to initiate a communication and the content includes one or more contacts, the communication is formed that includes the content and is automatically addressed to the one or more contacts.

20 Claims, 6 Drawing Sheets

U.S. PATENT DOCUMENTS

| | | |
|---|---|---|
| 6,697,825 B1 | 2/2004 | Underwood et al. |
| 6,784,925 B1 | 8/2004 | Tomat |
| 6,865,297 B2 | 3/2005 | Loui |
| 6,876,312 B2 | 4/2005 | Yu |
| 6,904,597 B2 | 6/2005 | Jin |
| 6,961,731 B2 | 11/2005 | Holbrook |
| 6,983,310 B2 | 1/2006 | Rouse |
| 6,987,991 B2 | 1/2006 | Nelson |
| 7,013,041 B2 | 3/2006 | Miyamoto |
| 7,058,955 B2 | 6/2006 | Porkka |
| 7,065,385 B2 | 6/2006 | Jarrad |
| 7,065,386 B1 | 6/2006 | Smethers |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,158,123 B2 | 1/2007 | Myers |
| 7,178,111 B2 | 2/2007 | Glein et al. |
| 7,216,588 B2 | 5/2007 | Suess |
| 7,249,326 B2 | 7/2007 | Stoakley |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,336,263 B2 | 2/2008 | Valikangas |
| 7,369,647 B2 | 5/2008 | Gao et al. |
| 7,388,578 B2 | 6/2008 | Tao |
| 7,403,191 B2 | 7/2008 | Sinclair |
| 7,447,520 B2 | 11/2008 | Scott |
| 7,461,151 B2 | 12/2008 | Colson et al. |
| 7,479,949 B2 | 1/2009 | Jobs |
| 7,480,870 B2 | 1/2009 | Anzures |
| 7,483,418 B2 | 1/2009 | Maurer |
| 7,496,830 B2 | 2/2009 | Rubin |
| 7,593,995 B1 | 9/2009 | He et al. |
| 7,606,714 B2 | 10/2009 | Williams et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,657,849 B2 | 2/2010 | Chaudhri et al. |
| 7,671,756 B2 | 3/2010 | Herz et al. |
| 7,702,683 B1 | 4/2010 | Kirshenbaum |
| 7,730,425 B2 | 6/2010 | de los Reyes et al. |
| 7,755,674 B2 | 7/2010 | Kaminaga |
| 7,834,861 B2 | 11/2010 | Lee |
| 7,877,707 B2 | 1/2011 | Westerman et al. |
| 7,889,180 B2 | 2/2011 | Byun et al. |
| 7,983,718 B1 * | 7/2011 | Roka ............................ 455/566 |
| 8,006,276 B2 | 8/2011 | Nakagawa et al. |
| 8,086,275 B2 | 12/2011 | Wykes et al. |
| 8,131,808 B2 | 3/2012 | Aoki et al. |
| 8,150,924 B2 | 4/2012 | Buchheit et al. |
| 8,175,653 B2 | 5/2012 | Smuga et al. |
| 8,238,876 B2 | 8/2012 | Teng |
| 8,250,494 B2 | 8/2012 | Butcher et al. |
| 8,255,473 B2 | 8/2012 | Eren et al. |
| 8,269,736 B2 | 9/2012 | Wilairat |
| 8,280,901 B2 | 10/2012 | McDonald |
| 8,355,698 B2 | 1/2013 | Teng et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway |
| 2002/0060701 A1 | 5/2002 | Naughton et al. |
| 2002/0070961 A1 | 6/2002 | Xu et al. |
| 2002/0091755 A1 | 7/2002 | Narin |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0154176 A1 | 10/2002 | Barksdale et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0040300 A1 | 2/2003 | Bodic |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0185883 A1 | 9/2004 | Rukman |
| 2004/0212586 A1 | 10/2004 | Denny, III |
| 2004/0217954 A1 | 11/2004 | O'Gorman et al. |
| 2004/0250217 A1 | 12/2004 | Tojo et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0114788 A1 | 5/2005 | Fabritius |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0059430 A1 | 3/2006 | Bells |
| 2006/0070005 A1 | 3/2006 | Gilbert et al. |
| 2006/0074771 A1 | 4/2006 | Kim |
| 2006/0103623 A1 | 5/2006 | Davis |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0199598 A1 | 9/2006 | Lee et al. |
| 2006/0218234 A1 | 9/2006 | Deng et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294396 A1 | 12/2006 | Witman |
| 2007/0005716 A1 | 1/2007 | LeVasseur et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 * | 2/2007 | Sherrard et al. ............... 345/157 |
| 2007/0038567 A1 | 2/2007 | Allaire et al. |
| 2007/0054679 A1 | 3/2007 | Cho et al. |
| 2007/0061306 A1 | 3/2007 | Pell et al. |
| 2007/0061714 A1 | 3/2007 | Stuple et al. |
| 2007/0067272 A1 | 3/2007 | Flynt |
| 2007/0073718 A1 | 3/2007 | Ramer et al. |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0106635 A1 | 5/2007 | Frieden et al. |
| 2007/0127638 A1 | 6/2007 | Doulton |
| 2007/0157089 A1 * | 7/2007 | Van Os et al. .................. 715/702 |
| 2007/0171192 A1 | 7/2007 | Seo et al. |
| 2007/0182595 A1 | 8/2007 | Ghasabian |
| 2007/0185847 A1 | 8/2007 | Budzik et al. |
| 2007/0192707 A1 | 8/2007 | Maeda et al. |
| 2007/0198420 A1 | 8/2007 | Goldstein |
| 2007/0211034 A1 | 9/2007 | Griffin et al. |
| 2007/0214429 A1 | 9/2007 | Lyudovyk et al. |

| | | |
|---|---|---|
| 2007/0216651 A1 | 9/2007 | Patel |
| 2007/0225022 A1 | 9/2007 | Satake |
| 2007/0233654 A1 | 10/2007 | Karlson |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0032681 A1 | 2/2008 | West |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0066010 A1 | 3/2008 | Brodersen et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0102863 A1 | 5/2008 | Hardy |
| 2008/0114535 A1 | 5/2008 | Nesbitt |
| 2008/0120571 A1 | 5/2008 | Chang et al. |
| 2008/0132252 A1 | 6/2008 | Altman et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0165132 A1 | 7/2008 | Weiss |
| 2008/0165136 A1 | 7/2008 | Christie et al. |
| 2008/0165163 A1 | 7/2008 | Bathiche |
| 2008/0167058 A1 | 7/2008 | Lee et al. |
| 2008/0168403 A1 | 7/2008 | Westerman et al. |
| 2008/0172609 A1 | 7/2008 | Rytivaara |
| 2008/0180399 A1 | 7/2008 | Cheng |
| 2008/0182628 A1 | 7/2008 | Lee et al. |
| 2008/0189658 A1 | 8/2008 | Jeong et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222560 A1 | 9/2008 | Harrison |
| 2008/0222569 A1 | 9/2008 | Champion |
| 2008/0242362 A1 | 10/2008 | Duarte |
| 2008/0259042 A1 | 10/2008 | Thorn |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1* | 12/2008 | Lockhart et al. ............... 455/466 |
| 2008/0301046 A1 | 12/2008 | Martinez |
| 2008/0301575 A1 | 12/2008 | Fermon |
| 2008/0307364 A1 | 12/2008 | Chaudhri et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0037469 A1 | 2/2009 | Kirsch |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1* | 3/2009 | Chaudhri et al. ............ 715/863 |
| 2009/0077649 A1 | 3/2009 | Lockhart |
| 2009/0083656 A1 | 3/2009 | Dukhon |
| 2009/0085851 A1 | 4/2009 | Lim |
| 2009/0085878 A1 | 4/2009 | Heubel |
| 2009/0089215 A1 | 4/2009 | Newton |
| 2009/0106694 A1 | 4/2009 | Kraft et al. |
| 2009/0109243 A1 | 4/2009 | Kraft |
| 2009/0117942 A1 | 5/2009 | Boningue et al. |
| 2009/0140061 A1 | 6/2009 | Schultz et al. |
| 2009/0140986 A1 | 6/2009 | Karkkainen et al. |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0205041 A1 | 8/2009 | Michalske |
| 2009/0228825 A1 | 9/2009 | Van Os et al. |
| 2009/0265662 A1 | 10/2009 | Bamford |
| 2009/0284482 A1 | 11/2009 | Chin |
| 2009/0293014 A1 | 11/2009 | Meuninck et al. |
| 2009/0298547 A1 | 12/2009 | Kim et al. |
| 2009/0307589 A1* | 12/2009 | Inose et al. ............... 715/702 |
| 2009/0307623 A1 | 12/2009 | Agarawala et al. |
| 2009/0313584 A1 | 12/2009 | Kerr et al. |
| 2009/0315847 A1* | 12/2009 | Fujii ........................... 345/173 |
| 2010/0008490 A1 | 1/2010 | Gharachorloo et al. |
| 2010/0075628 A1 | 3/2010 | Ye |
| 2010/0079413 A1 | 4/2010 | Kawashima et al. |
| 2010/0087169 A1 | 4/2010 | Lin |
| 2010/0087173 A1 | 4/2010 | Lin |
| 2010/0100839 A1 | 4/2010 | Tseng et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1* | 4/2010 | Friedman et al. ............ 455/566 |
| 2010/0105440 A1 | 4/2010 | Kruzeniski |
| 2010/0105441 A1 | 4/2010 | Voss |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0145675 A1 | 6/2010 | Lloyd et al. |
| 2010/0146437 A1 | 6/2010 | Woodcock et al. |
| 2010/0159994 A1 | 6/2010 | Stallings et al. |
| 2010/0159995 A1 | 6/2010 | Stallings et al. |
| 2010/0167699 A1 | 7/2010 | Sigmund et al. |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0295795 A1 | 11/2010 | Wilairat |
| 2010/0311470 A1 | 12/2010 | Seo et al. |
| 2010/0321403 A1 | 12/2010 | Inadome |
| 2011/0018806 A1 | 1/2011 | Yano |
| 2011/0055773 A1 | 3/2011 | Agarawala et al. |
| 2011/0093778 A1* | 4/2011 | Kim et al. ............... 715/702 |
| 2011/0231796 A1 | 9/2011 | Vigil |
| 2012/0028687 A1 | 2/2012 | Wykes et al. |
| 2012/0050185 A1 | 3/2012 | Davydov et al. |
| 2012/0179992 A1 | 7/2012 | Smuga |
| 2012/0212495 A1 | 8/2012 | Butcher |
| 2012/0244841 A1 | 9/2012 | Teng |

FOREIGN PATENT DOCUMENTS

| | | |
|---|---|---|
| EP | 0583060 | 2/1994 |
| EP | 1752868 | 2/2007 |
| JP | 2004227393 | 8/2004 |
| JP | 2004357257 | 12/2004 |
| KR | 200303655 | 2/2003 |
| KR | 20060019198 | 3/2006 |
| KR | 1020070036114 A | 4/2007 |
| KR | 1020070098337 A | 10/2007 |
| KR | 20070120368 | 12/2007 |
| KR | 1020080025951 | 3/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| TW | 201023026 | 6/2010 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |

| | | |
|---|---|---|
| WO | WO-2008035831 | 3/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010135155 | 11/2010 |

OTHER PUBLICATIONS

"PCT Search Report and Written Opinion", Application No. PCT/US2009/061735, (Jun. 7, 2010),11 pages.

Raghaven, Gopal et al., "Model Based Estimation and Verification of Mobile Device Performance", Retrieved from http://alumni.cs.ucsb.edu/~raimisl/emsoft04_12.pdf., (Sep. 27-29, 2004),10 Pages.

Reed, Brad "Microsoft Demos Windows Mobile 6.1 at CTIA", Retrieved from http://www.networkworld.com/news/2008/040208-ctia-microsoft-windows-mobile.html on Jul. 18, 2008., (Apr. 2, 2008),3 Pages.

Singh, Kundan et al., "CINEMA: Columbia InterNet Extensible Multimedia Architecture", Retrieved from http://www1.cs.columbia.edu/~library/TR-repository/reports/reports-2002/cucs-011-02.pdf, (Sep. 3, 2002),83 Pages.

Kcholi, Avi "Windows CE .NET Interprocess Communication", Retrieved from http://msdn.microsoft.com/en-us/library/ms836784.aspx on Jul. 17, 2008., (Jan. 2004),15 Pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007),pp. 1-42.

"Microsoft Internet Explorer Window.Createpopup() Method Creates Chromeless Windows", Retrieved from: <http://www.addict3d.org/news/2012/download.html>, Internet Explorer Window Restrictions,(Oct. 22, 2008),6 pages.

"Kiosk Browser Chrome Customization Firefox 2.x", Retrieved from: <http://stlouis-shopper.com/cgi-bin/mozdev-wiki/,pl?ChromeCustomization> Making a new chrome for the kiosk browser, Kiosk Project Kiosk Browser Chrome Customization Firefox-2.x,(Aug. 16, 2007),2 pages.

Harrison, Richard "Symbian OS C++ for Mobile Phones: vol. 3 ( Symbian Press): 3 (Paperback)", Retrieved from: <http://_www.amazon.co.uk/Symbian-OS-Mobile-Phones-Press/dp/productdescription/0470066415>, (Jun. 16, 2003),4 pages.

"How do you dial 1-800-Flowers", Retrieved from: <http://blogs.msdn.com/windowsmobile/archive/2007/02/06/how-do-you-dial-1-800-flowers.aspx>, (Feb. 6, 2007),24 pages.

"Blackberry office tools: Qwerty Convert", Retrieved from: <http://blackberrysoftwarelist.net/blackberry/download-software/blackberry-office/qwerty_convert.aspx>, (Nov. 20, 2008),1 page.

Gade, Lisa "Samsung Alias u740", Retrieved from: <http://www.mobiletechreview.com/phones/Samsung-U740.htm> on Nov. 20, 2008, (Mar. 14, 2007),6 pages.

"Dial a number", Retrieved from: <http://www.phonespell.org/ialhelp.html> on Nov. 20, 2008, (Nov. 20, 2008),1 page.

"Apple IPhone—8GB AT&T", Retrieved from: <http://nytimes.com.com/smartphones/apple-iphone-8gb-at/4515-6452_7-32309245.html>, (Jun. 29, 2007),11 pages.

"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/>, (May 13, 2008),11 pages.

"PocketShield—New Screenlock App for the HTC Diamond and Pro", Retrieved from: <http://wmpoweruser.com/?tag=htc-touch-diamond>, (Nov. 6, 2008),13 pages.

"SecureMe—Anti-Theft Security Application for S60 3rd", Retrieved from: <http://www.killermobile.com/newsite/mobile-software/s60-applications/secureme-%11-anti%11theft-security-application-for-s60-3rd.htm>, (Nov. 11, 2008),2 pages.

"Winterface Review", Retrieved from: <http://www.mytodayscreen.com/winterface-review/>, (Jul. 9, 2008),42 pages.

Oliver, Sam "Potential iPhone Usability and Interface Improvements", Retrieved from: <http://www.appleinsider.com/articles/08/09/18/potential_iphone_usability_and_interface_improvements.html>, (Sep. 18, 2008),4 pages.

"Google Android has Landed; T-Mobile, HTC Unveil G1", Retrieved from: <http://www.crn.com/retail/210603348> on Nov. 26, 2008., (Sep. 23, 2008),5 Pages.

"Alltel Adds Dedicated Search Key to Phones", Retrieved from: <http://www.phonescoop.com/news/item.php?n=2159> on Nov. 26, 2008., (Apr. 12,.2007),2 Pages.

Oryl, Michael "Review: Asus P527 Smartphone for North America", Retrieved from: <http://www.mobileburn.com/review.jsp?Id=4257> on Dec. 17, 2008., (Mar. 5, 2008),1 Page.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.

Ha, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008, (Nov. 2004),7 Pages.

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.

"Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.

"Keyboard (5)", Retrieved from: <http://landru.uwaterloo.ca/cgi-bin/man.cgi?section=5&topic=keyboard> on Dec. 11, 2008., (Aug. 11, 1997),8 Pages.

"Calc4M", Retrieved from: <http://www.hellebo.com/Calc4M.html>, (Sep. 10, 2008),4 Pages.

"MIDTB Tip Sheet: Book Courier", Retrieved from: <http://www.midtb.org/tipsbookcourier.htm> on Dec. 11, 2008., (Sep. 26, 2005),6 Pages.

"Freeware .mobi", Retrieved from: <http://www.palmfreeware.mobi/download-palette.html>, (Oct. 9, 2001),2 pages.

"Palette Extender 1.0.2", Retrieved from: <http://palette-extender.en.softonic.com/symbian>, (Jan. 21, 2003),2 pages.

Rice, Stephen V., et al., "A System for Searching Sound Palettes", Retrieved from: <http://www.comparisonics.com/FindSoundsPalettePaper.pdf>, (Feb. 28-29, 2008),6 pages.

"Multi-touch", Retrieved from <http://en.wikipedia.org/wiki/Multi-touch#Microsoft_Surface>, (Apr. 17, 2009),8 pages.

Wilson, Tracy V., "How the iPhone Works", Retrieved from: <http://electronics.howstuffworks.com/iphone2.htm>, (Jan. 2007),9 pages.

"DuoSense™ Multi-Touch Gestures", Retrieved from: <http://www.n-trig.com/Data/Uploads/Misc/DuoSenseMTG_final.pdf>, (Jul. 2008),4 pages.

Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004),13 Pages.

Nordgren, Peder "Development of a Touch Screen Interface for Scania Interactor", Retrieved from: <http://www.cs.umu.se/education/examina/Rapporter/PederNordgren.pdf>, (Apr. 10, 2007),67 Pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),pp. 1-2.

"Symbian Applications", Retrieved from: <http://symbianfullversion.blogspot.com/2008_12_01_archive.html> on May 5, 2009., (Jan. 2009),51 Pages.

Remond, Mickael "Mobile Marketing Magazine", Retrieved from: <http://www.mobilemarketingmagazine.co.uk/mobile_social_networking/> on May 5, 2009., (Apr. 28, 2009),16 Pages.

"Womma", Retrieved from: <http://www.womma.org/blog/links/wom-trends/> on May 5, 2009., (2007),70 Pages.

Dolcourt, Jessica "Webware", Retrieved from: <http://news.cnet.com/webware/?categoryId=2010> on May 5, 2009., (Apr. 2009),13 Pages.

"HTC Shows HTC Snap with Snappy Email Feature", Retrieved from: <http://www.wirelessandmobilenews.com/smartphones/ on May 5, 2009>, (May 4, 2009),10 Pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008),3 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008),7 Pages.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.

Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (2006),4 Pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),pp. 1-14.

"Mobile/UI/Designs/TouchScreen", Retrieved from: <https://wiki.mozilla.org/Mobile/UI/Designs/TouchScreen> on May 6, 2009., (Feb. 2009),15 Pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008),7 Pages.

Terpstra, Brett "Beta Beat: Grape, a New Way to Manage Your Desktop Clutter", *Retrieved from: Beta Beat: Grape, a New Way to Manage Your Desktop Clutter* on May 6, 2009., (Apr. 14, 2009),16 Pages.

"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009.,29 Pages.

"Content-Centric E-Mail Message Analysis in Litigation Document Reviews", Retrieved from: http://www.busmanagement.com/article/Issue-14/Data-Management/Content-Centric-E-Mail-Message-Analysis-in-Litigation-Document-Reviews/., (May 6, 2009),4 Pages.

Mao, Jeng "Comments of Verizon Wireless Messaging Services, LLC", Retrieved from: http://www.ntia.doc.gov/osmhome/warnings/comments/verizon.htm on May 6, 2009., 5 Pages.

"Oracle8i Concepts Release 8.1.5", Retrieved from: http://www.cs.umbc.edu/help/oracle8/server.815/a67781/c16queue.htm on May 6, 2009., 10 Pages.

"Oracle8i Application Developers Guide—Advanced Queuing", Retrieved from: http://www.cs.umbc.edu/help/oracle8/server.815/a68005/03_adq1i.htm on May 6, 2009., 29 Pages.

"Touch Shell Free", Retrieved from: <http://www.pocketpcfreeware.mobi/download-touch-shell-free.html> on May 5, 2009., (Feb. 23, 2009),2 Pages.

"Parallax Scrolling", Retrieved from: <http://en.wikipedia.org/wiki/Parallax_scrolling> on May 5, 2009., (May 4, 2009),3 Pages.

Steinicke, Frank et al., "Multi-Touching 3D Data: Towards Direct Interaction in Stereoscopic Display Environments coupled with Mobile Devices", Retrieved from: <http://viscg.uni-muenster.de/publications/2008/SHSK08/ppd-workshop.-pdf.>, (Jun. 15, 2008),4 Pages.

Mann, Richard et al., "Spectrum Analysis of Motion Parallax in a 3D Cluttered Scene and Application to Egomotion", Retrieved from: <http://www.cs.uwaterloo.ca/~mannr/snow/josa-mann-langer.pdf.>, (Sep. 2005),15 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.

"PCT Search Report", Application Serial No. PCT/US2009/061864, (May 14, 2010),10 pages.

"International Search Report", Application No. PCT/US2010/028553, Application Filing Date: Mar. 24, 2010,(Nov. 9, 2010),9 pages.

"PCT Search Report and Written Opinion", Application No. PCT/US2010/034772, (Dec. 29, 2010),12 pages.

"International Search Report", Mailed Date: Jan. 19, 2011, Application No. PCT/US2010/038730, Filed Date: Jun. 15, 2010, pp. 8.

"PCT Search Report and Written Opinion", Application No. PCT/US2010/028699, (Oct. 4, 2010),10 pages.

"PCT Search Report and Written Opinion", Application No. PCT/US2010/028555, (Oct. 12, 2010),10 pages.

"Advisory Action", U.S. Appl. No. 12/414,382, (Jan. 20, 2012),3 pages.

"Final Office Action", U.S. Appl. No. 12/244,545, (Dec. 7, 2011),16 pages.

"Final Office Action", U.S. Appl. No. 12/413,977, (Nov. 17, 2011),16 pages.

"Final Office Action", U.S. Appl. No. 12/414,382, (Dec. 23, 2011),7 pages.

"Final Office Action", U.S. Appl. No. 12/414,476, (Dec. 1, 2011),20 pages.

"Final Office Action", U.S. Appl. No. 12/433,605, (Feb. 3, 2012),11 pages.

"Final Office Action", U.S. Appl. No. 12/469,458, (Nov. 17, 2011),15 pages.

"Non-Final Office Action", U.S. Appl. No. 12/414,434, (Jan. 17, 2012),7 pages.

"Non-Final Office Action", U.S. Appl. No. 12/433,667, (Feb. 3, 2012),16 pages.

"Non-Final Office Action", U.S. Appl. No. 12/469,419, (Nov. 9, 2011),15 pages.

"Non-Final Office Action", U.S. Appl. No. 12/470,558, (Nov. 22, 2011),9 pages.

"Non-Final Office Action", U.S. Appl. No. 12/484,845, (Dec. 7, 2011),16 pages.

"Non-Final Office Action", U.S. Appl. No. 12/560,081, (Dec. 7, 2011),16 pages.

"Notice of Allowance", U.S. Appl. No. 12/414,455, (Jan. 4, 2012),4 pages.

"Notice of Allowance", U.S. Appl. No. 12/414,458, (Oct. 31, 2011),2 pages.

"Notice of Allowance", U.S. Appl. No. 12/414,458, (Nov. 29, 2011),2 pages.

La, Nick "Parallax Gallery", Available at <http://webdesignerwall.comtutorials/parallax-gallery/comment-page-1>,(Apr. 25, 2008),16 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.

"Final Office Action", U.S. Appl. No. 12/433,667, (Sep. 13, 2011),17 pages.

"Non-Final Office Action", U.S. Appl. No. 12/244,545, (Aug. 17, 2011),15 pages.

"Non-Final Office Action", U.S. Appl. No. 12/413,977, (Jul. 19, 2011),17 pages.

"Non-Final Office Action", U.S. Appl. No. 12/414,382, (Jul. 26, 2011),9 pages.

"Non-Final Office Action", U.S. Appl. No. 12/414,434, (Aug. 2, 2011),6 pages.

"Non-Final Office Action", U.S. Appl. No. 12/414,455, (Aug. 29, 2011),8 pages.

"Non-Final Office Action", U.S. Appl. No. 12/414,458, (Jul. 6, 2011),8 pages.

"Non-Final Office Action", U.S. Appl. No. 12/414,476, (Aug. 3, 2011),21 pages.

"Non-Final Office Action", U.S. Appl. No. 12/433,605, (Jun. 24, 2011),10 pages.

"Non-Final Office Action", U.S. Appl. No. 12/433,667, (Jun. 7, 2011),15 pages.

"Non-Final Office Action", U.S. Appl. No. 12/469,458, (Jul. 1, 2011),15 pages.

"Non-Final Office Action", U.S. Appl. No. 12/469,480, (Sep. 22, 2011),14 pages.

"Notice of Allowance", U.S. Appl. No. 12/414,458, (Aug. 10, 2011),6 pages.

"Advisory Action", U.S. Appl. No. 12/433,605, (Apr. 5, 2012), 3 pages.

"Extended European Search Report", European Patent Application No. 09818253.8, (Apr. 10, 2012), 7 pages.

"Final Office Action", U.S. Appl. No. 12/469,480, (Feb. 9, 2012), 17 pages.

"Final Office Action", U.S. Appl. No. 12/560,081, (Mar. 14, 2012), 16 pages.

"Non-Final Office Action", U.S. Appl. No. 12/244,545, (Mar. 27, 2012), 18 pages.

"Non-Final Office Action", U.S. Appl. No. 12/414,434, (May 31, 2012), 7 pages.

"Non-Final Office Action", U.S. Appl. No. 12/469,419, (May 23, 2012), 13 pages.

"Notice of Allowance", U.S. Appl. No. 12/414,382, (Apr. 4, 2012), 4 pages.

"Notice of Allowance", U.S. Appl. No. 12/470,558, (Apr. 2, 2012), 7 pages.

"Notice of Allowance", U.S. Appl. No. 12/484,845, (Mar. 16, 2012), 5 pages.

Beiber, Gerald et al., "Screen Coverage: A Pen-Interaction Problem for PDA's and Touch Screen Computers", In Proceedings of ICWMC 2007,(Mar. 2007), 6 pages.

Wyatt, Paul "/Flash/the art of parallax scrolling", .net Magazine,(Aug. 1, 2007), pp. 74-76.

"Final Office Action", U.S. Appl. No. 12/244,545, (Sep. 7, 2012),23 pages.

"Non-Final Office Action", U.S. Appl. No. 12/413,977, (Jul. 20, 2012),18 pages.

"Non-Final Office Action", U.S. Appl. No. 12/469,458, (Sep. 21, 2012),14 pages.

"Non-Final Office Action", U.S. Appl. No. 12/480,969, (Aug. 7, 2012),15 pages.

"Non-Final Office Action", U.S. Appl. No. 13/492,495, (Sep. 17, 2012),8 pages.

"Notice of Allowance", U.S. Appl. No. 12/414,434, (Aug. 17, 2012),4 pages.

"Notice of Allowance", U.S. Appl. No. 12/470,558, (Aug. 23, 2012),2 pages.

"Final Office Action", U.S. Appl. No. 12/480,969, (Nov. 23, 2012), 18 pages.

"Foreign Office Action", Chinese Application No. 201080023212.1, (Dec. 5, 2012), 10 pages.

"Non-Final Office Action", U.S. Appl. No. 12/414,476, (Nov. 9, 2012), 22 pages.

"Non-Final Office Action", U.S. Appl. No. 12/469,480, (Oct. 17, 2012), 16 pages.

"Non-Final Office Action", U.S. Appl. No. 13/492,495, (Dec. 19, 2012), 6 pages.

"Notice of Allowance", U.S. Appl. No. 12/469,419, (Nov. 27, 2012), 13 pages.

"Final Office Action", U.S. Appl. No. 12/433,667, (Jan. 7, 2013), 17 pages.

"Foreign Office Action", Chinese Application No. 201080015728.1, (Dec. 26, 2012), 9 pages.

"Foreign Office Action", Chinese Application No. 201080015788.3, (Dec. 24, 2012), 10 pages.

"Non-Final Office Action", U.S. Appl. No. 12/433,605, (Jan. 11, 2013), 7 pages.

\* cited by examiner

MOBILE COMMUNICATIONS DEVICE USER INTERFACE

RELATED APPLICATIONS

This application claims priority under 35 U.S.C. Section 119(e) to U.S. Provisional Patent Applications Nos. 61/107,945, 61/107,935, and 61/107,921, each of which was filed on Oct. 23, 2008, the entire disclosures of which are hereby incorporated by reference in their entirety.

BACKGROUND

Mobile communication devices (e.g., wireless phones) have become an integral part of everyday life. However, the form factor employed by conventional mobile communications devices is typically limited to promote mobility of the mobile communications device.

For example, the mobile communications device may have a relatively limited amount of display area when compared to a conventional desktop computer, e.g., a PC. Therefore, conventional techniques used to interact with a desktop computer may be inefficient when employed by a mobile communications device. For example, it may be difficult to select multiple items of content using convention techniques on a mobile communications device that has a limited amount of display area.

SUMMARY

A mobile communications device user interface is described. In an implementation, a method is implemented by a mobile communications device that includes outputting a user interface having a portion that is configured to accept content. When an option is selected in relation to the portion to initiate a communication and the content includes one or more contacts, the communication is formed that includes the content and is automatically addressed to the one or more contacts.

In an implementation, one or more computer-readable storage media includes instructions that are executable by a mobile communications device to configure a user interface to include a portion that is configured to accept a plurality of contacts via a drag-and-drop operation. The instructions are further configured to provide an option that is selectable to initiate a communication to each of the plurality of contacts.

In an implementation, a mobile communications device includes a display device, a processor, and memory configured to maintain a plurality of applications and an operating system that are executable on the processor. The operating system is configured to expose a feature to the plurality of applications to output in a user interface for display on the display device. The feature involves a portion that is selectable in the user interface to accept content via a drag-and-drop operation and output one or more indications of actions that are performable on each of the content accepted in the portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Mobile communications devices typically have a small form factor to aide mobility of the mobile communications device. For example, the mobile communications device (e.g., a mobile phone) may be configured with a relatively minimal amount of display area and limited input devices (e.g., a keypad) so that the device may be easily transported. Consequently, traditional techniques used to interact with a conventional computer (e.g., a desktop PC) may be frustrating when used in conjunction with a mobile communications device.

For instance, selection and sharing of content (e.g., photos, video, and so on) on a mobile communications device may be difficult using traditional techniques due to the limitations of the small form factor described above. Consequently, traditional mobile communications devices were configured to interact with a single item of content at a time.

A mobile communications device user interface is described. In an implementation, a portion of a user interface is configured as a "bucket" to allow a user to drag-and-drop multiple items of content into it. The portion may be persisted between applications by an operating system such that a user may navigate between applications and store items of content from the applications using the portion. Actions may then be applied to the content that has been accepted in the bucket as a whole, such as to form a communication, a playlist, and so on, further discussion of which may be found in relation to the following sections.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations.

Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

Figure 1:
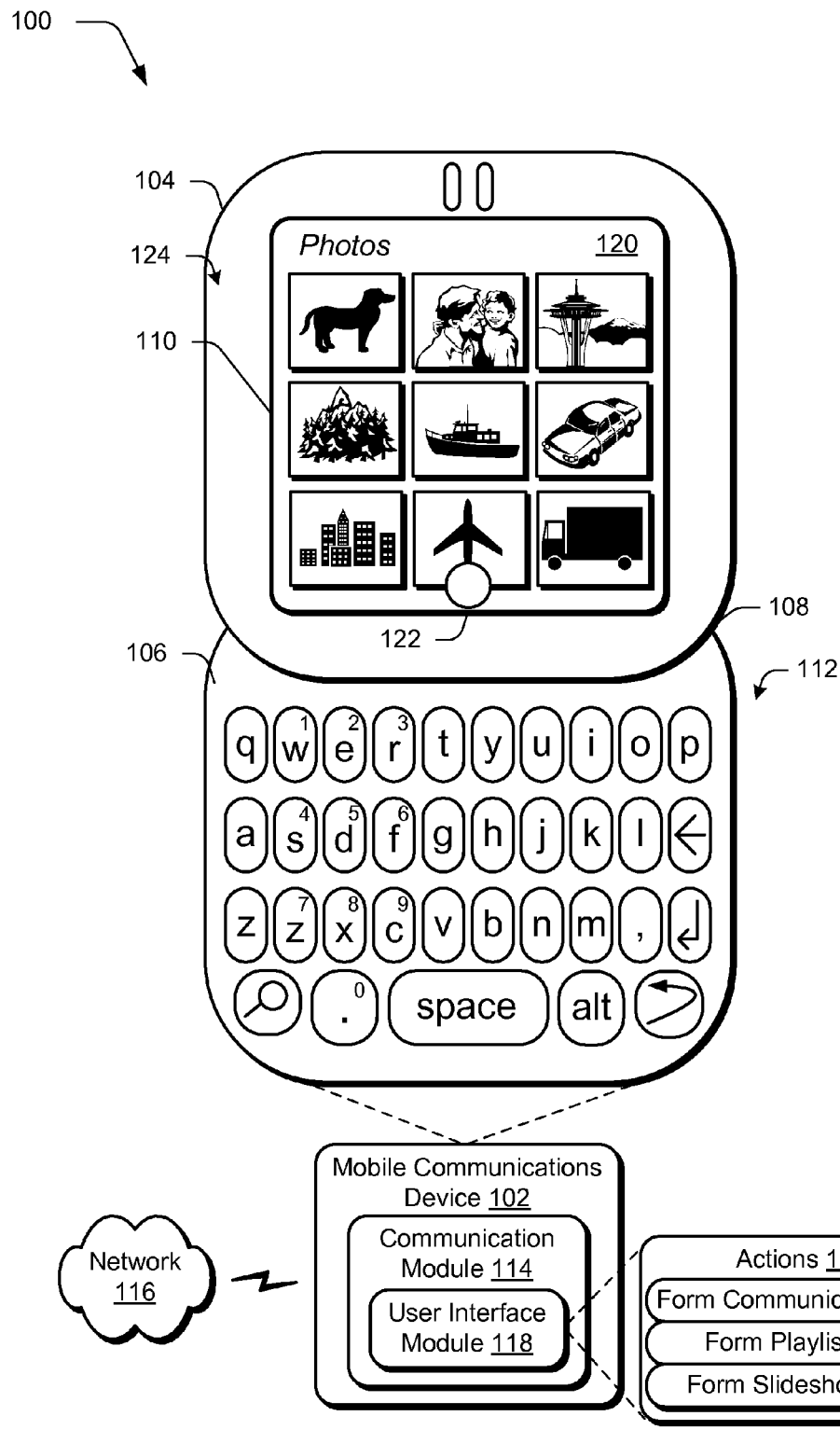
FIG. 1 is an illustration of an example implementation of a mobile communications device in accordance with one or more embodiments of devices, features, and systems for mobile communications.
Figure 2:
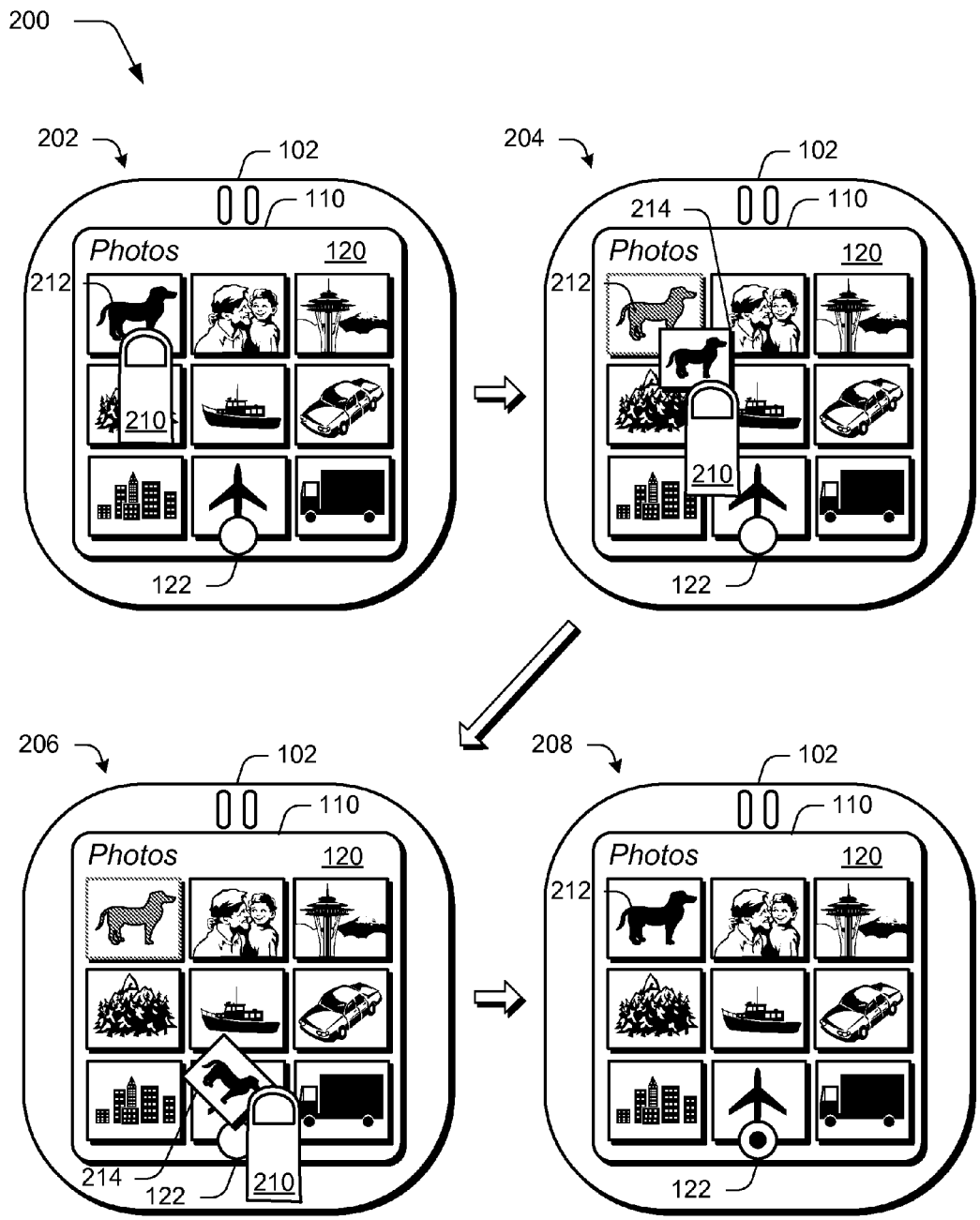
FIG. 2 is an illustration of a system in an example implementation that shows a gesture that is used to collect content in the portion of the user interface of FIG. 1.
Figure 3:
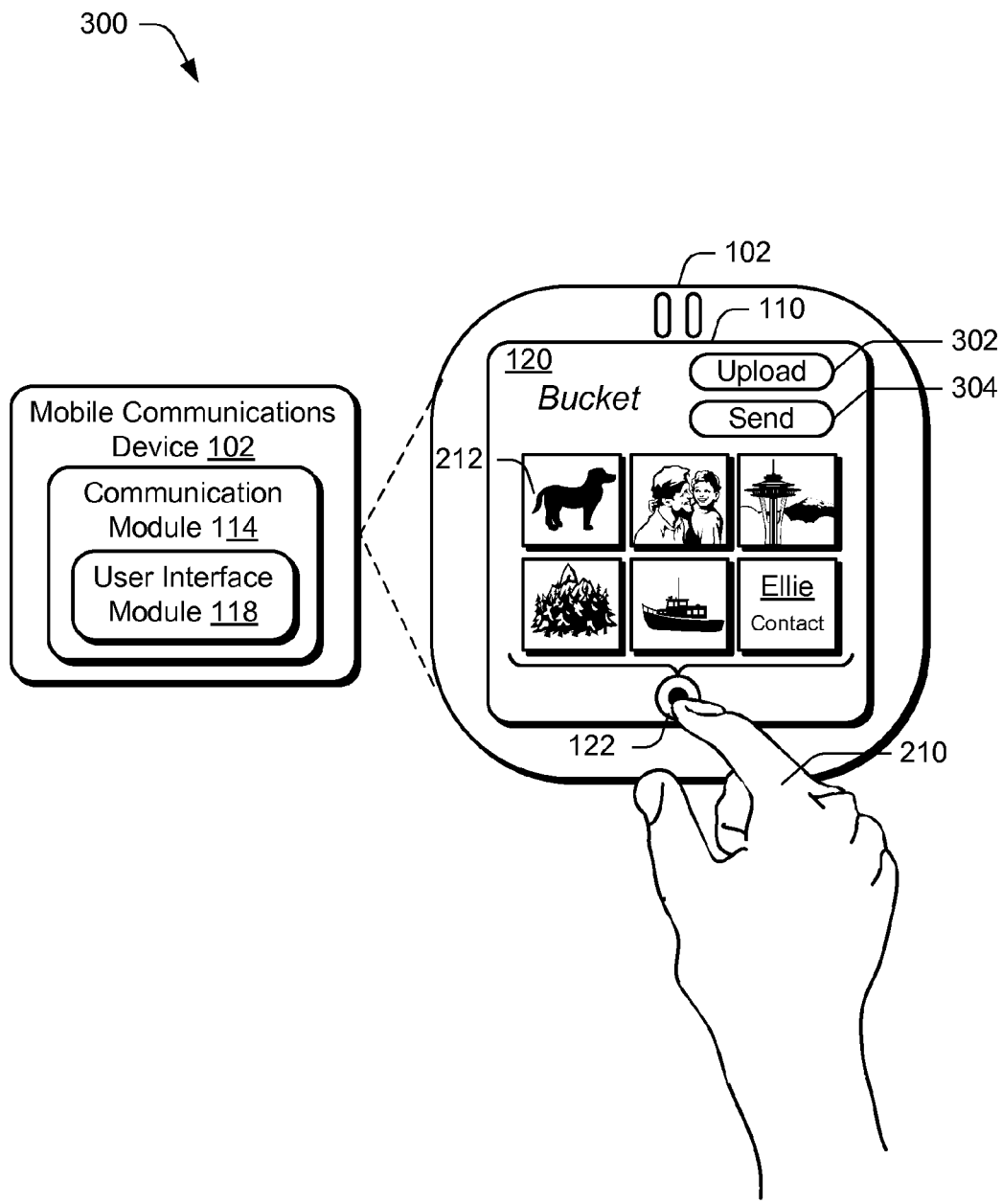
FIG. 3 is an illustration of a system in an example implementation in which content is shown that is accepted into a portion of FIG. 2.

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration as illustrated in FIG. 1 in which the mobile communications device 102 is "open" and a configuration in which the mobile communications device 102 is "closed" as illustrated in FIGS. 2-3.

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of content, such as a caller identification (ID), contacts, images (e.g., photos) as illustrated, email, multimedia messages, Internet browsing, game play, music, video and so on. In an implementation, the display device 110 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may be used to detect gestures, further discussion of which may be found in relation to FIGS. 2 and 3.

The second housing 106 is illustrated as including a keyboard 112 that may also be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the "open" configuration as illustrated in the example implementation 100 of FIG. 1, the first housing 104 is moved (e.g., slid) "away" from the second housing 106 using the slide 108. Other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to capture content, form short message service (SMS) text messages, multimedia messaging service (MMS) messages, emails, status updates to be communicated to a social network service, and so on. A user, for instance, may input a status update for communication via the network 116 to the social network service. The social network service may then publish the status update to "friends" of the user, e.g., for receipt by the friends via a computer, respective mobile communications devices, and so on. A variety of other examples are also contemplated, such as blogging, instant messaging, and so on.

The mobile communications device 102 is also illustrated as including a user interface module 118. The user interface module 118 is representative of functionality of the mobile communications device 102 to generate, manage, and/or output a user interface 120 for display on the display device 110. A variety of different techniques may be employed to generate the user interface.

For example, the user interface module 118 may configure the user interface 120 to include a portion 122 to collect a plurality of content, such as the images 124 in the user interface 120 of FIG. 1. The user interface module 118 may then expose a plurality of actions 126 that may be performed using each of the content collected in the portion 122. A variety of different actions 126 may be performed, such as to form a communication 128, form a playlist 130, form a slideshow 132, and so on. Thus, in this way content may be first collected using the portion 122 (the "bucket") and then an object (e.g., the communication, playlist, or slideshow) may be formed. This differs from conventional techniques in which the object was first formed (e.g., a playlist, a communication, and so on) and then populated with content. A variety of different techniques may be used to collect content using the portion 122, an example of which is described in relation to the following figure.

FIG. 2 illustrates a system 200 in an example implementation in which a gesture that is used to collect content in the portion 122 of the user interface 120. The illustrated system 200 shows a plurality of steps 202, 204, 206, 208 that are used to collect content in the portion 122. The mobile communication device 102 is illustrated in the first step 202 as outputting the user interface 120 having a plurality of content, which are images in this example. A user's finger 210 selects the image 212 of the dog by placing the finger 210 against the surface of the display device 110.

At the second step 204, touchscreen functionality of the mobile communications device 102 is used to detect the selection. In response, a thumbnail image 214 of the image 212 of the dog is created which follows the dragging of the user's finger 210 across the display device 210. For example, an animation may be displayed to give the appearance that the thumbnail image 210 "pops off" the image 212 of the dog. Additionally, the display of the image 212 may also be changed to indicate the selection, which is illustrated through the use of grayscale in the second step 204.

At the third step 206, the thumbnail image 214 has been dragged proximal to the portion 122 of the user interface 120 to follow the user's finger 210. In response, an animation is displayed that gives an appearance of the thumbnail image 214 being "dropped in the bucket." For example, the animation may cause the thumbnail image 214 to be rotated and scaled (e.g., shrunk). In this way, the user is informed that the content (e.g., the image 212) is being input. A variety of other examples are also contemplated.

At the fourth step 208, the display of the image 212 returns back to the original state, e.g., to match the original state in the first step 202. Additionally, a display of the portion 122 is changed to indicate that the portion contains the image. Thus, the user is informed in this instance that the portion 122 "contains" the image 122. This process may be repeated to include a wide variety of content in the portion 122 from a wide variety of applications. For example, the content included in the portion 122 may be heterogeneous (e.g., "mixed") to include music, images, movies, contacts, documents, and so on obtained from a variety of different applications. Although a drag-and-drop operation has been described for a single item of content, multiple items may also be selected (e.g., sequentially or at one time) and then dragged together. A variety of different actions may then be performed based on what content is included in the portion 122, further discussion of which may be found in relation to the following figure.

FIG. 3 illustrates a system 300 in an example implementation in which content is shown that is accepted into the portion 122. A user's hand 210 is shown as selecting the portion 122, which causes content that has been placed "in" the portion 122 to be displayed in the user interface 120.

The user interface 120 may also include options that are selectable to perform represented actions, examples of which are illustrated as upload 302 and send 304. The upload 302 option is selectable to cause content included in the portion 122 to be uploaded to a network site, such as a social network service. For example, the user interface module 118 may determine that a contact (e.g., "Ellie" in the illustrated example) has been included in the portion 122. Accordingly, the user interface module 118 may upload content that is not the contact to a network location specified in the contact "Ellie." A similar technique may also be employed to form a communication to one or multiple contacts, further discussion of which may be found in relation to the following procedures.

Example Procedures

The following discussion describes user interface techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200-300 of FIGS. 1-3, respectively.

Figure 4:
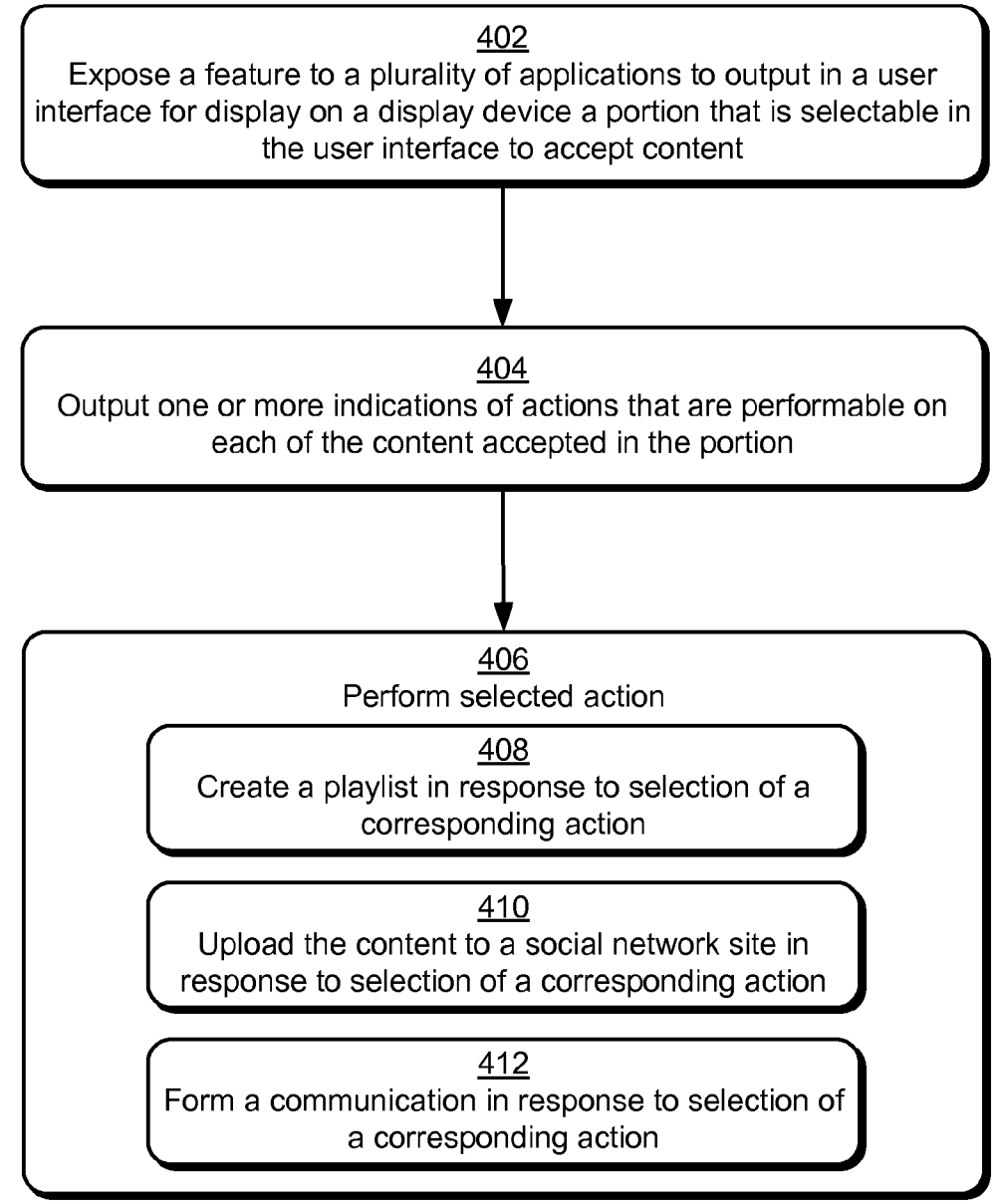
FIG. 4 is a flow diagram depicting a procedure in an example implementation in which a portion is output in a user interface that is configured to accept content and then perform an action involving each of the content.

FIG. 4 depicts a procedure 400 in an example implementation in which a portion is output in a user interface that is configured to accept content and then perform an action involving each of the content. A feature is exposed to a plurality of application to output, in a user interface for display on a display device, a portion that is selectable in the user interface to accept content (block 402). For example, functionality of the media module 108 may be incorporated within an operating system that is executable on a processor of the mobile media device 104 and is storable in memory or other computer-readable storage media of the mobile communications device 104. The operating system may expose this functionality to applications that are also executed on the mobile communications device 104 via an application programming interface (API). Further discussion of an operating system may be found in relation to FIG. 6.

One or more indications of actions are output that are performable on each of the content accepted in the portion (block 404). Thus, in this example, the content is gathered and then a variety of actions are performable on the content by selecting the action (block 406). For example, a playlist may be created in response to selection of a corresponding action (block 408) "create playlist" when the portion includes content configured as media, e.g., songs, videos, and so on. In another example, the content may be uploaded to a social network site in response to selection of a corresponding action (block 410) "upload." For instance, the media module 108 may automatically (or in conjunction with manual interaction of a user) provide credentials to a social network website via the network 106 to upload content to a user's account upon selection of an "upload" action. In a further example, a communication is formed in response to selection of a corresponding action (block 412), such as an email, text message, and so on. Further discussion of communication formation may be found in relation to the following figure.

Figure 5:
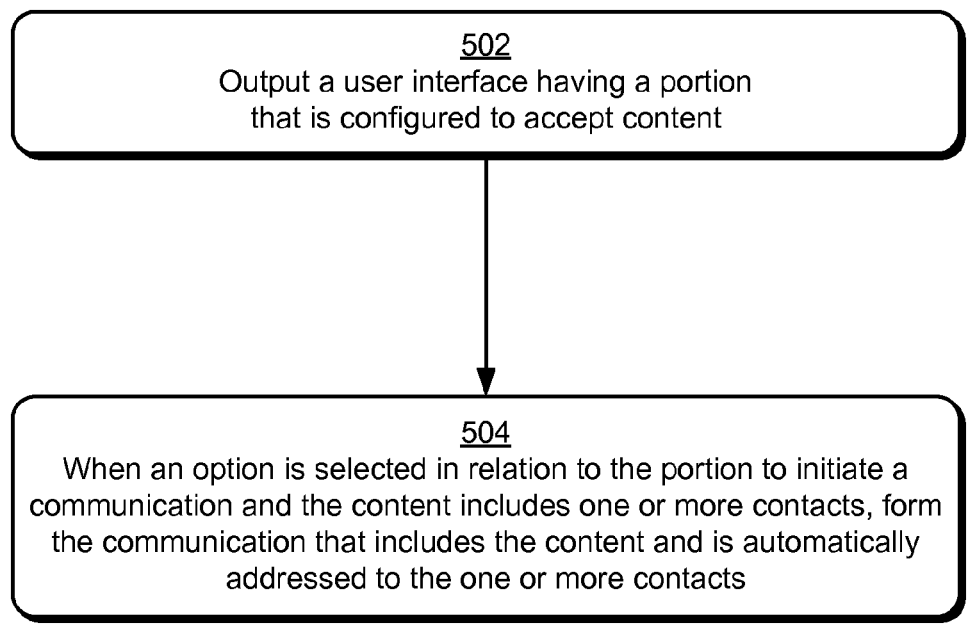
FIG. 5 is a flow diagram depicting a procedure in an example implementation in which a user interface is output having a portion that is configured to accept content and usable to automatically form a communication without further user interaction.

FIG. 5 depicts a procedure 500 in an example implementation in which a user interface is output having a portion that is configured to accept content and usable to automatically form a communication without further user interaction. A user interface is output that has a portion that is configured to accept content (block 502). For example, the portion 122 may accept content such as images, music, and contacts.

When an option is selected in relation to the portion to initiate a communication and the content includes one or more contacts, the communication is formed to include the content and is automatically addressed to the one or more contacts (block 504). For example, the media module 108 may identify which of the content accepted via the portion 122 includes relevant contact information, e.g., a telephone number, email address, and so on. Therefore, when an option is selected (e.g., a representation of an action "email") the communication is formed and populated with the relevant contact information of each of the contacts accepted by the portion 122 automatically and without further user interaction. A variety of other examples are also contemplated, such as formation of a SMS, MMS, and so on.

Example Device

Figure 6:
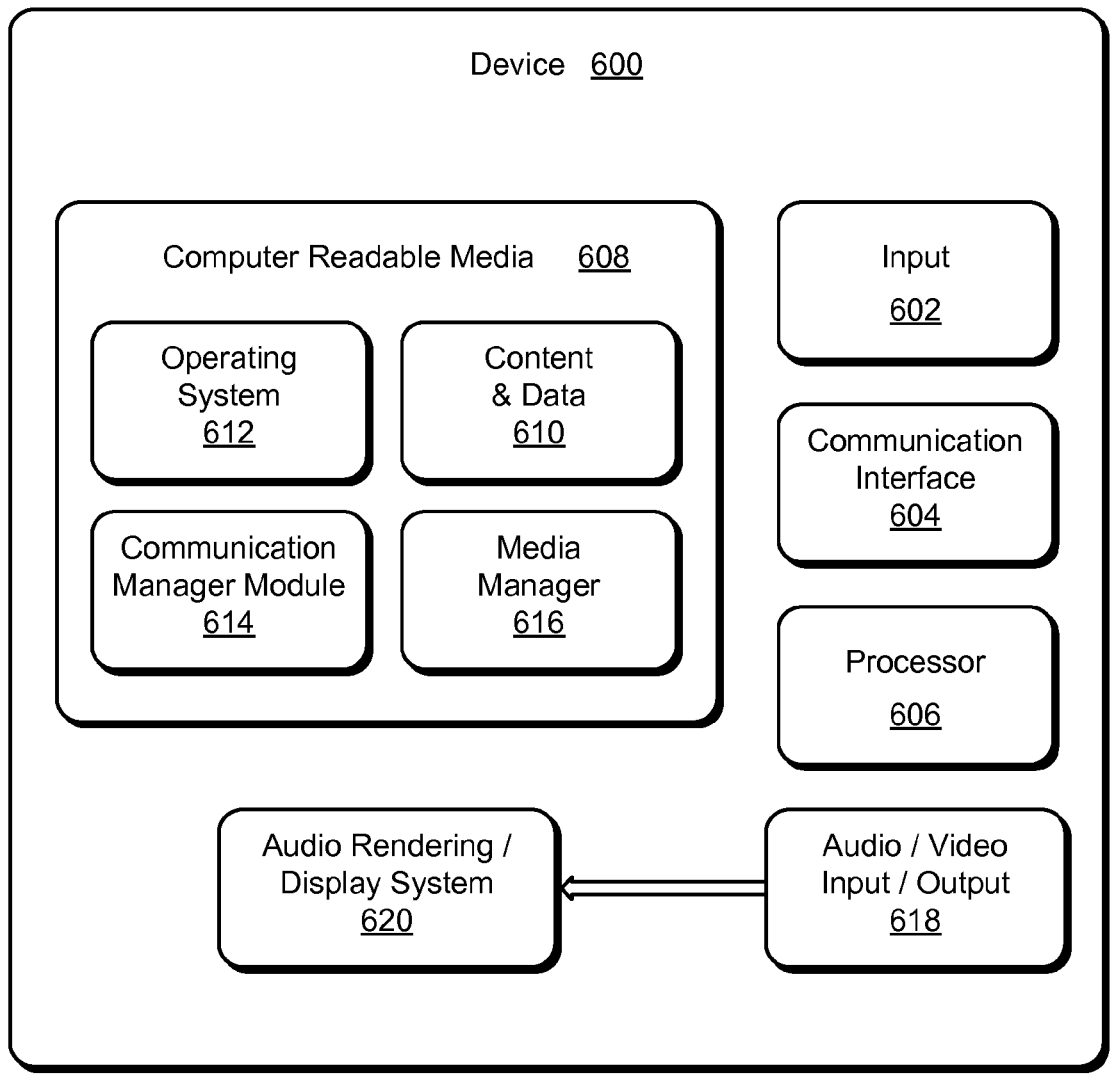
FIG. 6 illustrates various components of an example device that can be implemented in various embodiments as any type of a mobile device to implement embodiments of devices, features, and systems for mobile communications.

FIG. 6 illustrates various components of an example device 600 that can be implemented in various embodiments as any type of a mobile device to implement embodiments of devices, features, and systems for mobile communications. For example, device 600 can be implemented as any of the mobile communications devices 102 described with reference to respective FIGS. 1-3. Device 600 can also be implemented to access a network-based service, such as a social network service as previously described.

Device 600 includes input 602 that may include Internet Protocol (IP) inputs as well as other input devices, such as the keyboard 112 of FIG. 1. Device 600 further includes communication interface 604 that can be implemented as any one or more of a wireless interface, any type of network interface, and as any other type of communication interface. A network interface provides a connection between device 600 and a communication network by which other electronic and computing devices can communicate data with device 600. A wireless interface enables device 600 to operate as a mobile device for wireless communications.

Device 600 also includes one or more processors 606 (e.g., any of microprocessors, controllers, and the like) which process various computer-executable instructions to control the operation of device 600 and to communicate with other electronic devices. Device 600 can be implemented with computer-readable media 608, such as one or more memory components, examples of which include random access memory (RAM) and non-volatile memory (e.g., any one or more of a read-only memory (ROM), flash memory, EPROM, EEPROM, etc.).

Computer-readable media 608 provides data storage to store content and data 610, as well as device applications and any other types of information and/or data related to operational aspects of device 600. For example, an operating system 612 can be maintained as a computer application with the computer-readable media 608 and executed on processor 606. Device applications can also include a communication manager module 614 (which may be used to provide telephonic functionality) and a media manager 616.

Device 600 also includes an audio and/or video output 618 that provides audio and/or video data to an audio rendering and/or display system 620. The audio rendering and/or display system 620 can be implemented as integrated component(s) of the example device 600, and can include any components that process, display, and/or otherwise render audio, video, and image data. Device 600 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a device, the method comprising:
    outputting a user interface having a portion that is configured to accept content via a drag-and-drop operation involving a gesture that gives an appearance of a thumbnail image detected through interaction with a display device of the mobile communications device using touchscreen functionality, the content accepted by the portion remaining hidden from view;
    presenting an indication during the drag-and-drop operation indicating that the content is being input into the portion;
    in response to a selection of the portion, displaying the content accepted by the portion; and
    when an option is selected in relation to the portion to initiate a communication, and a first item of content includes one or more contacts and a second item of content does not include one or more contacts, forming the communication to be automatically addressed to the one or more contacts of the first item and that is configured to communicate the second item of content included in the portion over a network by the device.

2. A method as described in claim 1, wherein the communication is an email and the one or more contacts include at least one email address that is used to automatically address the communication.

3. A method as described in claim 1, wherein the communication is a multimedia messaging service (MMS) communication and the one or more contacts include at least one telephone number that is used to automatically address the communication.

4. A method as described in claim 1, wherein the communication is an upload to a social network service and the one or more contacts include at least one network address that is used to automatically address the communication.

5. A method as described in claim 1, wherein the portion is provided by an operating system and exposed to a plurality of applications such that the content accepted by the portion persists during navigation between the applications.

6. A method as described in claim 1, wherein: the thumbnail image of the content is displayed in the user interface as following the gesture; and when the thumbnail image is displayed proximally to the portion, an animation is displayed in the user interface to show acceptance of the thumbnail image by the portion.

7. A method as described in claim 6, wherein the animation involves rotation and scaling of the thumbnail image.

8. A method as described in claim 1, wherein a display state of the portion changes when the content has been accepted by the portion to indicate the acceptance.

9. One or more tangible computer-readable storage media devices comprising instructions that are executable by a mobile communications device to configure a user interface to:
    include a portion that is configured to accept a plurality of contacts via a drag-and-drop operation involving a gesture that gives an appearance of a thumbnail image detected through interaction with a display device of the mobile communications device using touchscreen functionality;
    present an indication during the drag-and-drop operation indicating that at least one of the plurality of contacts is being input into the portion;
    receive, by the portion, content that is not displayed in the portion;
    in response to a selection of the portion, display the received content and at least one of the accepted plurality of contacts; and
    provide an option that is selectable to initiate a communication to a network location specified by each of the displayed plurality of contacts, the communication including the received content.

10. One or more tangible computer-readable media devices as described in claim 9, wherein the communication is a single email that is addressed to each of the plurality of contacts.

11. One or more tangible computer-readable media devices as described in claim 9, wherein the communication is a single multimedia messaging service (MMS) communication that is addressed to each of the plurality of contacts using respective telephone numbers.

12. One or more tangible computer-readable media devices as described in claim 9, wherein the communication is an upload to be performed to a plurality of members of one or more social network services.

13. One or more tangible computer-readable media devices as described in claim 9, wherein the option is selectable to output a plurality of additional options, each of the plurality of additional options indicating a different communication technique.

14. One or more tangible computer-readable media devices as described in claim 9, wherein the portion is provided by an operating system and exposed to a plurality of applications such that the content accepted by the portion persists during navigation between the applications.

15. One or more tangible computer-readable media devices as described in claim 9, wherein:
    the thumbnail image of the content is displayed in the user interface as following the gesture; and
    when the thumbnail image is displayed proximally to the portion, an animation is displayed in the user interface to show acceptance of the thumbnail image by the portion.

16. A mobile communications device comprising: a display device;
    a processor; and
    memory configured to maintain a plurality of applications and an operating system that are executable on the processor, wherein the operating system is configured to expose a feature to the plurality of applications to output in a user interface for display, on the display device, a portion that is selectable in the user interface to:
        accept content via a drag-and-drop operation involving a gesture that gives an appearance of a thumbnail image detected through interaction with the display device of the mobile communications device using touch-screen functionality;
        hide the accepted content from view on the display device until a selection of the portion is received; and
        output one or more indications of actions that are performable on each of the content accepted in the portion; and
    wherein the user interface is configured to present an indication during the drag-and-drop operation indicating that the content is being input into the portion.

17. A mobile communications device as described in claim 16, wherein the actions include creation of a playlist and initiation of a slide show.

18. A mobile communications device as described in claim 16, wherein the portion provided by the operating system and exposed to the plurality of applications is configured such that the content accepted by the portion persists during navigation between the applications.

19. A mobile communications as described in claim 16, wherein the content includes an image, video, or a contact.

20. A mobile communications device as described in claim 16, wherein:
    the thumbnail image of the content is displayed in the user interface as following the gesture; and
    when the thumbnail image is displayed proximally to the portion, an animation is displayed in the user interface to show acceptance of the thumbnail image by the portion.

* * * * *